United States Patent
Rose et al.

(10) Patent No.: US 8,675,017 B2
(45) Date of Patent: Mar. 18, 2014

(54) REAL WORLD GAMING FRAMEWORK

(75) Inventors: Gregory Gordon Rose, San Diego, CA (US); Miriam Wiggers De Vries, Crows Nest (AU); Michael Paddon, Tokyo (JP); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 11/768,888

(22) Filed: Jun. 26, 2007

(65) Prior Publication Data

US 2009/0005140 A1    Jan. 1, 2009

(51) Int. Cl.
G09G 5/00 (2006.01)

(52) U.S. Cl.
USPC .......................................... 345/633

(58) Field of Classification Search
None
See application file for complete search history.

(56) References Cited

U.S. PATENT DOCUMENTS

| | | | |
|---|---|---|---|
| 6,366,856 B1* | 4/2002 | Johnson ...................... 701/213 |
| 7,557,736 B1* | 7/2009 | Daily et al. ................ 340/995.1 |
| 7,564,469 B2* | 7/2009 | Cohen ......................... 345/632 |
| 2002/0010734 A1* | 1/2002 | Ebersole et al. ............. 709/201 |
| 2005/0289590 A1* | 12/2005 | Cheok et al. .................. 725/37 |
| 2006/0069503 A1* | 3/2006 | Suomela et al. ............. 701/211 |
| 2006/0105838 A1* | 5/2006 | Mullen ........................ 463/31 |
| 2006/0135260 A1* | 6/2006 | Boss et al. ................... 463/42 |
| 2006/0258420 A1 | 11/2006 | Mullen |
| 2006/0267783 A1* | 11/2006 | Smith .......................... 340/601 |
| 2006/0277474 A1* | 12/2006 | Robarts et al. .............. 715/745 |
| 2007/0049313 A1 | 3/2007 | Grams et al. |
| 2007/0087828 A1* | 4/2007 | Robertson ..................... 463/42 |
| 2007/0132785 A1* | 6/2007 | Ebersole et al. ............. 345/633 |
| 2007/0233367 A1* | 10/2007 | Chen et al. .................. 701/207 |
| 2007/0238529 A1* | 10/2007 | Iwamoto et al. .............. 463/42 |
| 2008/0071559 A1* | 3/2008 | Arrasvuori ..................... 705/1 |
| 2008/0194323 A1* | 8/2008 | Merkli et al. ................. 463/30 |
| 2008/0250337 A1* | 10/2008 | Lemmela et al. ............ 715/764 |
| 2008/0266323 A1* | 10/2008 | Biocca et al. ................ 345/633 |

(Continued)

FOREIGN PATENT DOCUMENTS

| | | |
|---|---|---|
| EP | 1574239 | 9/2005 |
| GB | 2417694 | 3/2006 |
| TW | I231887 | 5/2005 |
| WO | 2007010336 | 1/2007 |

OTHER PUBLICATIONS

International Search Report—PCT/US08/067778, International Search Authority—European Patent Office, Sep. 3, 2008.

(Continued)

*Primary Examiner* — James A Thompson
*Assistant Examiner* — David H Chu
(74) *Attorney, Agent, or Firm* — Jeffrey D. Jacobs (57) ABSTRACT

A virtual environment and real world environment are combined into a framework that facilitates large-scale social interaction in multi-player fantasy games played in both the real world and/or a virtual world. Such combination of real and virtual world features may blend geo-caching, orienteering, and other virtual gaming features to enable players to interact across the real and virtual environments. A real world player is also mapped into the virtual environment, thereby inserting the player's movements and actions into the virtual environment. Additionally, this feature enables interaction between players located in a real environment with characters found in a virtual environment. A player may use a mobile device that is configured to recognize the geo-location and orientation of the player and display a corresponding view of the virtual environment gaming landscape for the player.

32 Claims, 8 Drawing Sheets

Real Environment → Virtual Environment

(56) References Cited

U.S. PATENT DOCUMENTS

| | | | |
|---|---|---|---|
| 2008/0268876 A1* | 10/2008 | Gelfand et al. | 455/457 |
| 2008/0319664 A1* | 12/2008 | Kremin et al. | 701/213 |
| 2009/0036186 A1* | 2/2009 | Benco et al. | 463/9 |

OTHER PUBLICATIONS

Written Opinion—PCT/US08/067778, International Search Authority—European Patent Office, Sep. 3, 2008.

* cited by examiner

REAL WORLD GAMING FRAMEWORK

BACKGROUND

1. Field

The present invention relates to gaming applications, and particularly to a method, system, and/or device that maps features in a real environment to a virtual environment to extend the gaming landscape and player interaction to the real environment.

2. Background

Virtual worlds allow people to immerse themselves in an environment while playing the role of a made-up character. Virtual world gaming has become very popular in recent years, some games attracting millions of players. The attraction of such games is that there is a rich fantasy world in which cooperating groups of players solve puzzles, collect magic things, and/or kill monsters, but the players seem to derive much of their pleasure from the interactions with each other, rather than merely from the game itself. However, some significant downsides to such virtual world games is that they keep players sitting on a computer for long periods of time, limit real world interactions, and often lead to gaming addiction.

It is also clear that not all of the value in communication comes from having content pushed to the user. The biggest growth areas have been things like presence services such as Instant Messaging and chat rooms, and multi-player games such as virtual world gaming. Some multi-player virtual world games include chat capability automatically. Everquest™ and World of Warcraf™ are examples of two such virtual world games.

Another phenomenon is the "flash mob", where a large group of people assemble suddenly in a location, do something for a brief period of time, and then quickly disperse. For example, hundreds or thousands of people may use internet instant messaging or cellphone SMS to organize a sudden get together. The first flash mobs were benign, parties or mass pillow fights, but more recently the same organization methods have been used to create mass demonstrations in France. The common theme is communication-enabled interpersonal interaction.

"Orienteering" has been popular for some decades, but is currently being revolutionized by location services in the form of global positioning systems (GPS). A larger scale phenomenon that has come about more recently is "geocaching" in which people go searching for treasures that other people have planted, based only on a fine-grained location and description of the hiding place. Surprisingly, there is still a large element of interpersonal interest in geocaching, because the players usually communicate with other players by writing in log books left with the treasure, and often leave treasure items of their own in place of whatever they might take. Communities arise to chat on the internet about what they have been doing.

Consequently, an opportunity exists for developing services and/or business models based on virtual world and/or real world communication-enabled interpersonal interaction.

SUMMARY

A method is provided for extending a gaming landscape from a real environment into a virtual environment. A real environment location of a player is identified and data for the identified real environment location is obtained. Features of the real environment are mapped into a virtual environment. Such mapping of features of the real environment to the virtual environment may include (a) identifying one or more buildings in an area surrounding the real environment location and (b) associating at least one of the one or more buildings with a virtual object. For instance, the virtual object may be integrated into the virtual environment at a location corresponding to its real environment location.

A virtual environment gaming landscape is then generated using real environment data. The virtual environment gaming landscape may be integrated into a game and displayed to the player. The displayed gaming landscape may be adjusted based on the movements of the player.

Additionally, identifying information for the player may be obtained along with a location for the player in the real environment. A game character associated with the player may be obtained and embedded into the virtual environment gaming landscape. Movements of the player may be tracked in the real environment and the character in the gaming landscape is adjusted according to the movements of the player in the real environment.

Interactions between the character and other characters in the gaming landscape may be managed and interactions between the player and other players in the real environment may be tracked. Similarly, interactions between the player in the real environment and one or more characters in the gaming landscape may also be managed. Such interactions may include at least one of fighting, cooperating, trading, and competing with between the player and the characters in the gaming landscape. For instance, an object may be exchanged, sold, and/or traded in the real and/or virtual environment. Similarly, transactions using currency in the real environment for assets in the virtual environment may also be facilitated.

A mobile device may also be provided comprising a location module and a processing circuit. The location module may identify the location of the mobile device in a real environment. The processing circuit may be configured to (a) ascertain location information for a user of the mobile device; (b) map features of the real environment into a virtual environment gaming landscape based on the location information; and/or (c) an output device coupled to the processing circuit to display the virtual environment gaming landscape to the user.

The mobile device may further comprise an orientation detector coupled to the processing circuit to provide orientation information for the mobile device. The processing circuit may be further configured to display a view of the virtual environment gaming landscape corresponding to a view indicated by the orientation information.

The mobile device may further comprise a motion detection module coupled to the processing circuit, the motion detection module serving to ascertain user motion in the real environment. The processing circuit may be further configured to (a) associate a game character in the virtual environment gaming landscape to the user; and/or (b) adjust the movement of the game character according to the motion of the user in the real environment.

The mobile device may further comprise a communication module coupled to the processing circuit to wirelessly receive gaming information other characters corresponding to other users in the real environment. The processing circuit may be further configured to facilitate interactions between the user and the other characters in the virtual environment.

The mobile device may further comprise an image capture device to capture images of the real environment. The processing circuit may be further configured to use the images to map features between the real environment and the virtual environment. The image capture device is configured to refine the position and orientation of the user within the virtual environment gaming landscape.

Consequently, a mobile device is provided comprising: (a) means for identifying a real environment location of a player; (b) means for obtaining data for the identified real environment location; (c) means for mapping features of the real environment into a virtual environment; (d) means for generating a virtual environment gaming landscape using real environment data; (e) means for integrating the virtual environment gaming landscape into a game; (f) means for displaying the gaming landscape to the player; (g) means for adjusting the displayed gaming landscape based on the movements of the player. The mobile device may also include (h) means for identifying one or more buildings in an area surrounding the real environment location; and/or (i) means for associating at least one of the one or more buildings with a virtual object. Some embodiments of the mobile device may also include (j) means for obtaining identifying information for the player; (k) means for identifying a location for the player in the real environment; (l) means for obtaining a game character associated with the player; (m) means for embedding the character into the virtual environment gaming landscape; (n) means for tracking movements of the player in the real environment; and/or (o) means for moving the character in the gaming landscape according to the movements of the player in the real environment.

In yet another implementation, a processing circuit (e.g., chip, processor, semiconductor device, etc.) may be configured to (a) identify a real environment location of a player; (b) obtain data for the identified real environment location; (c) map features of the real environment into a virtual environment; (d) generate a virtual environment gaming landscape using real environment data; (e) integrate the virtual environment gaming landscape into a game; (f) display the gaming landscape to the player; (g) adjust the displayed gaming landscape based on the movements of the player; (h) identify one or more buildings in an area surrounding the real environment location; (i) associate at least one of the one or more buildings with a virtual object; (j) obtain identifying information for the player; (k) identify a location for the player in the real environment; (l) obtain a game character associated with the player; (m) embed the character into the virtual environment gaming landscape; (n) track movements of the player in the real environment; and/or (o) move the character in the gaming landscape according to the movements of the player in the real environment.

A machine-readable medium is also provided having one or more instructions for mapping a real environment to a virtual environment as part of an interactive game, which when executed by a processor causes the processor to: (a) identify a real environment location of a player; (b) obtain data for the identified real environment location; (c) map features of the real environment into a virtual environment; (d) generate a virtual environment gaming landscape using real environment data; (e) integrate the virtual environment gaming landscape into a game; (f) display the gaming landscape to the player; (g) adjust the displayed gaming landscape based on the movements of the player; (h) identify one or more buildings in an area surrounding the real environment location; (i) associate at least one of the one or more buildings with a virtual object; (j) obtain identifying information for the player; (k) identify a location for the player in the real environment; (l) obtain a game character associated with the player; (m) embed the character into the virtual environment gaming landscape; (n) track movements of the player in the real environment; and/or (o) move the character in the gaming landscape according to the movements of the player in the real environment.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One feature combines a virtual environment and real world environment into a framework that facilitates large-scale social interaction in multi-player fantasy games played in both the real world and/or a virtual world. Such combination of real and virtual world features may blend geo-caching, orienteering, and other virtual gaming features to enable players to interact across the real and virtual environments.

Another feature maps a real world person into a virtual environment, thereby inserting the person's movements and actions into the virtual environment. Additionally, this feature enables interaction between characters located in a real environment with those found in a virtual environment.

Implementation of such gaming framework may be aided by a mobile device that is configured to recognize the geo-location and orientation of the user and display a corresponding view of the virtual environment for the user. Such device may utilize wireless communication technology, including location based services, to move the players from their static computers and interact with each other.

Yet another aspect provides a business model in which real world and virtual world economies may be blended to facilitate branding opportunities and revenue generation.

Framework for Blending of Real and Virtual Environments

Conventional virtual gaming environments have the disadvantage of keeping players bound to a desk thereby limiting substantive interaction with other players. Additionally, such virtual gaming environments are typically limited to what can be displayed on the player's screen. A novel feature provides for blending real environments and virtual environments to facilitate real interaction with other players as well as expanding the realm of the virtual environment.

Figure 1:
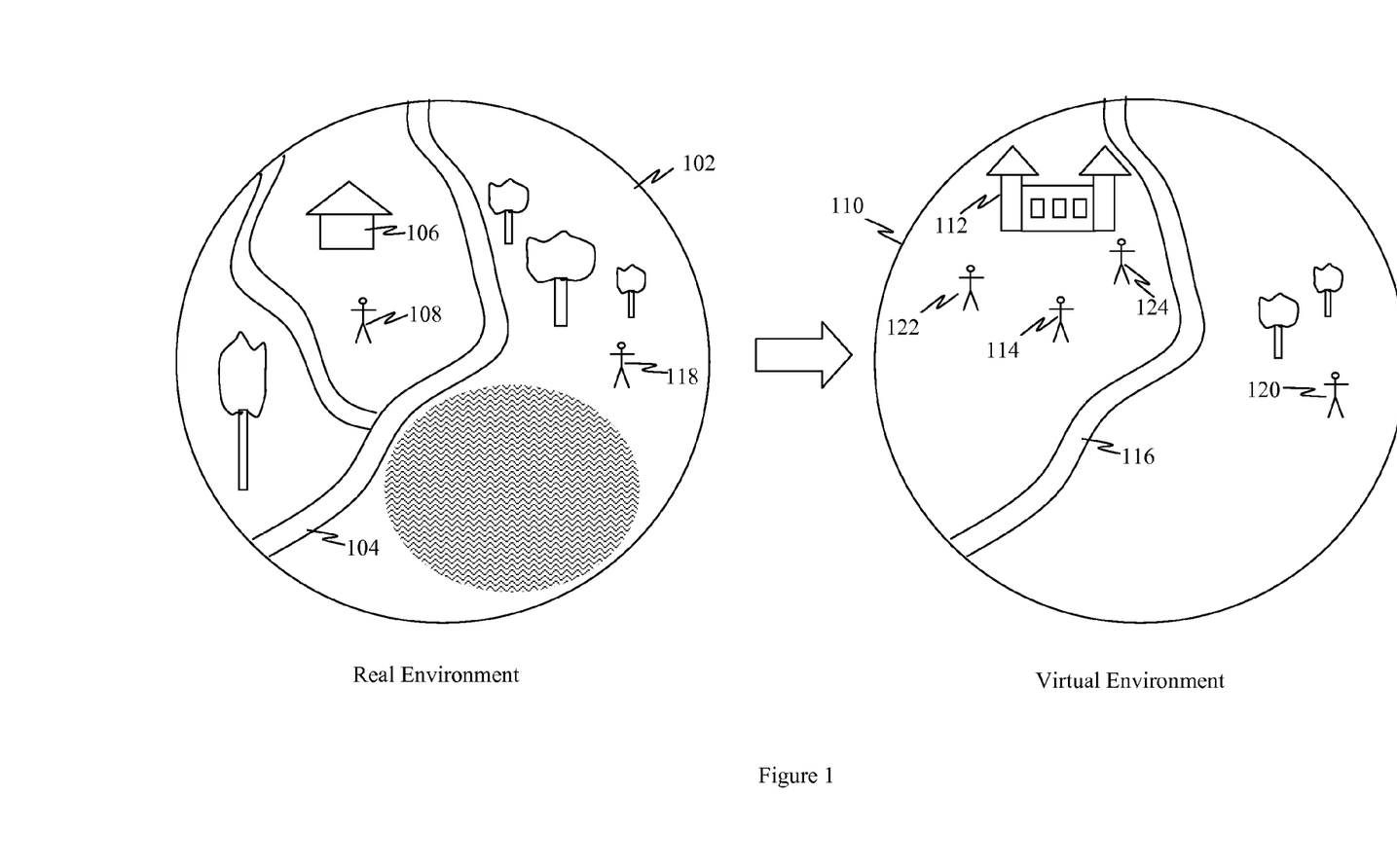
FIG. 1 illustrates an example of how a real environment and virtual environment may be blended as part of a virtual interactive game.

FIG. 1 illustrates an example of how a real environment and virtual environment may be blended as part of a virtual interactive game. This concept contemplates mapping features (e.g., buildings, landmarks, trees, streets, parks, lakes, etc.) from a real environment 102 to a virtual environment 110 and vice versa. For example, a player 108 traveling in a real world environment (such as a park, street, etc.) may have his/her surroundings (e.g., buildings, landmarks, trees, streets, parks, lakes, etc.) mapped into the virtual environment 110. The virtual environment 110 may be displayed to the player 108 on a mobile device, such as a display for a mobile phone or other electronic device.

In mapping the real environment 102 to the virtual environment 110, some (or all) of the features (e.g., buildings, landmarks, trees, streets, parks, lakes, etc.) in the real environment 110 may correspond to features (e.g., castles, hills, bridges, moats, battlefields, etc.) in the virtual environment 110. In some implementations, a few of the real environment 102 features (such as prominent features) are approximately mapped to features in the virtual environment 110. For example, a main trail 104 may be mapped to a path 116 and a kiosk 106 may be mapped to a castle 112. Such mapping of features from the real environment 102 to the virtual environment 110 allows a player in the real environment 102 to associate his/her surroundings to those displayed in the virtual environment 110. For example, as the player 108 walks through the real environment 102, the corresponding virtual environment 110 is displayed to him/her. Thus, the player 108 is able to identify the path 116 as the trail 104 and the castle 112 as the kiosk 106.

In addition to mapping features between the real and virtual environments, the player 108 in the real environment 102 may be mapped to a corresponding character 114 in the virtual environment 110. The character 114 in the virtual environment 110 follows the movements of the player 108 in the real environment 102. The mobile device used by the player 108 may include positioning and/or movement sensors (e.g., global positioning system, accelerometers, gyroscopes, altimeters, electronic compass, etc.) that capture the player's movements and is used to update the movement of the virtual character 114. Additionally, the view displayed by the mobile device may be adjusted depending on the direction the player 108 is facing in the real environment 102 so that it corresponds to the same view in the virtual environment 110.

As the player 108 travels in the real environment, the virtual interactive game operating on the mobile device may inform the player 108 of challenges, treasures, opponents, etc. For example, the virtual environment 110 may show other players who are in the vicinity. For instance, a real player 118 that is nearby in the real environment 102 may be mapped to a character 120 in the virtual environment 110. Additionally, other players 122 and 124 may also be displayed on the virtual environment 110. These players 122 and 124 may be playing from a remote location (e.g., from a home computer, etc.) or may be created by the virtual interactive game (e.g., monsters, virtual partners or opponents, etc.).

Figure 2:
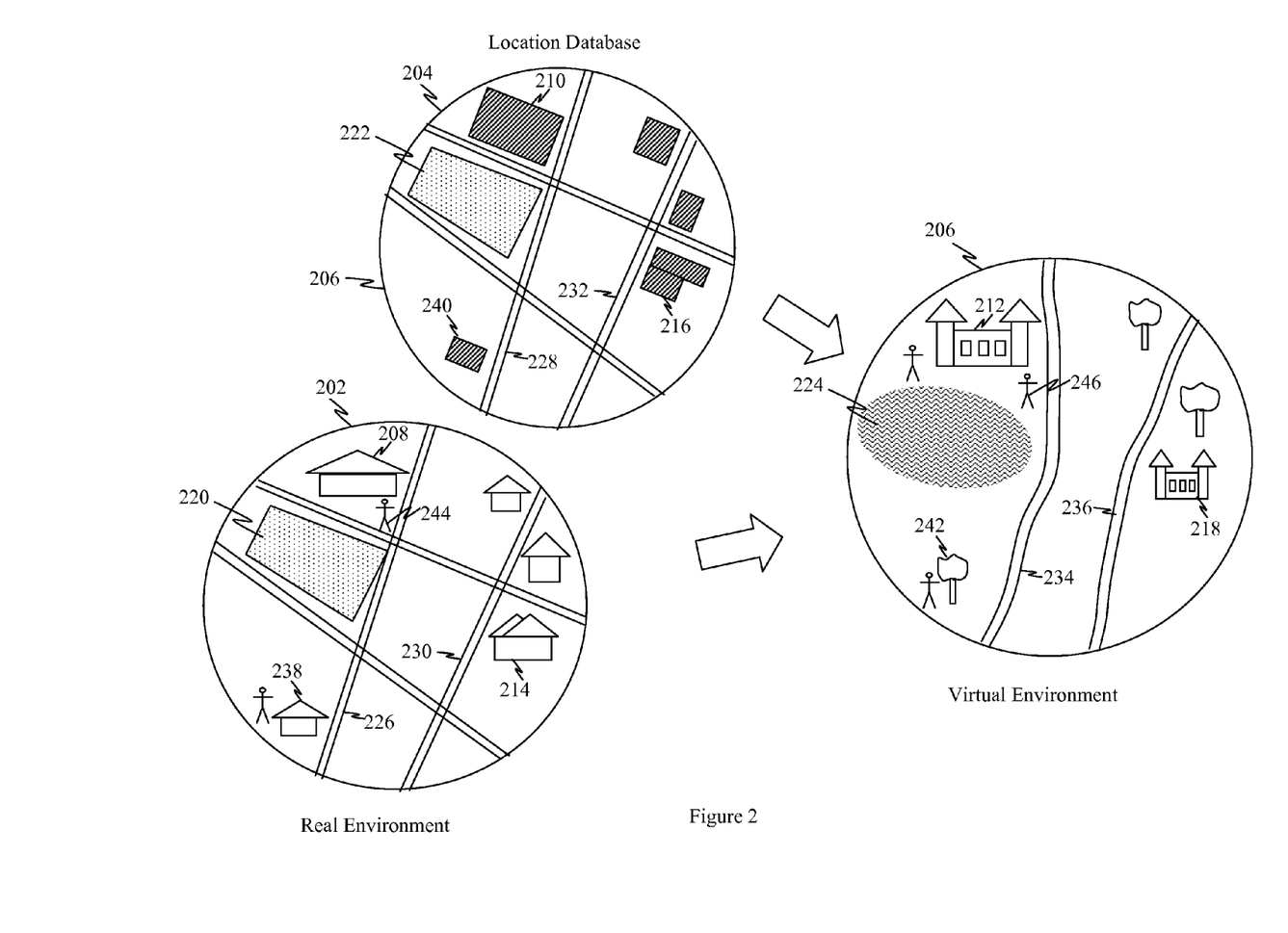
FIG. 2 illustrates another example of mapping features and characters between a real environment and a virtual environment in a virtual interactive game.

FIG. 2 illustrates another example of mapping features and characters between a real environment and a virtual environment in a virtual interactive game. In this example, a real environment 202 (e.g., an urban city area) and map data from a location database 204 may be used to map real features into a virtual environment 206. For instance, a first building 208 (real environment 202) and 210 (location database 204) may be mapped into a castle 212 in the virtual environment 206 and a second building 214/216 may be mapped to a cottage 218. Similarly, a park 220/222 may be mapped into a lake 224, and streets 226/228 and 230/232 are mapped to corresponding paths or trails 234/236. Some features in the real environment 202 may be transposed into a different type of feature in the virtual environment 206. For instance, a house 238/240 may be mapped to a tree 242 in the virtual environment 206. A player 244 in the real environment 202 may also be mapped to a character 246 in the virtual environment 206.

The use of the location database 204 may facilitate positioning of features from the real environment 202 when mapped into the virtual environment 206. In some implementations, the virtual environment 206 may be rendered based on either images captured by the mobile device used by a player or other location data obtained from one or more location databases 204 (e.g., map information, satellite images, terrain elevation data, etc.)

The examples illustrated in FIGS. 1 and 2 blend real and virtual environments to bring landscapes of virtual gaming from the traditional computer screen into the real world. For instance, the landscape in a game quest may be mapped to streets of a suburb or the trails of a national park. The opponents (e.g., monsters, etc.) being fought may be a virtual character or another player in the real environment.

The mobile devices used by the players to play the virtual interactive game may serve to display the virtual environment to a player, facilitate inter-player communications (when players are not close enough to each other to shout), and management of the virtual game elements (e.g., generate virtual characters such as monsters, generate virtual object such as magic talismans, cast spells, shooting between players, dying, etc.). That is, the virtual game may be executed by the mobile device and (possibly) a gaming server.

Treasures and/or rewards in the virtual interactive game may be real (e.g., a free drink at a local coffee shop that sponsors the game) or imagined (e.g., accumulation of points in the game being played).

In some implementations, different real environments may be mapped to the same virtual environment, thereby allowing players in the different real environments to play with and/or against each other. For example, two different parks in different cities may be sufficiently similar that they can be mapped into the same virtual environment. This may permit forming teams in which the teammates are located in different locations. In some instances teams that are geographically separated may cooperate in tasks where a first team performs some action to enable a second team to proceed to a second task. For example, team A in San Diego has to find a magic scroll and read the incantation on it (e.g., teammates of team A may assemble on a particular location of a real environment to read or decipher the incantation) which is then sent (e.g., via electronic communication channels) to team B in Sydney which gets instructions as to where to go next. Teams may also be "mixed" in that some team members may be physically present at a location on a real environment while others may be at home accessing the corresponding virtual environment over a network (e.g., Internet). This makes the game inclusive of disabled people or simple couch potatoes, while still adding a level of reality for players that play on the real environment.

Figure 3:
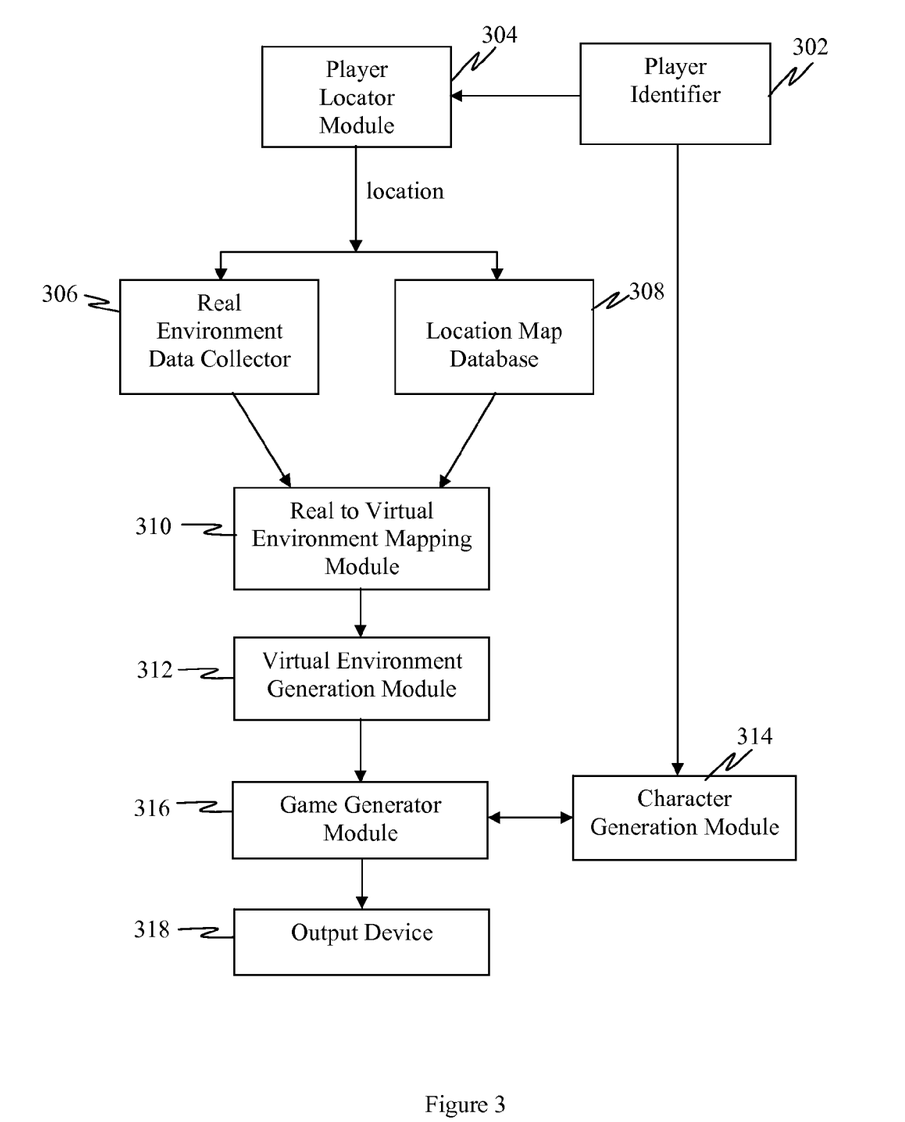
FIG. 3 is a block diagram illustrating a plurality of components that may operate to blend a real environment and a virtual environment as part of a virtual interactive game.

FIG. 3 is a block diagram illustrating a plurality of components that may operate to blend a real environment and a virtual environment as part of a virtual interactive game. A player identifier 302 may serve to identify one or more characteristics of a player that starts playing a game. A player locator module 304 is coupled to the player identifier and configured to ascertain location information for the player. For example, the player locator module 304 may determine whether the player is present in a real environment that corresponds to a virtual environment for the game or whether the player is playing the game remotely from a home computer. If a player is playing from a real environment, a real environment data collector 306 and a location map database 308 are used to obtain information for the real environment. A real to virtual environment mapping module 310 then uses that information to map the elements from the real environment into the virtual environment. A virtual environment generation module 312 then generates the virtual environment. A character generation module 314 may create virtual characters and/or map a player to a virtual character. A game generator module then combines the virtual environment and characters into an interactive game. For instance, in the interactive game, players may compete (alone or in teams) to achieve a goal or beat another player or group of players. An output module 318 (e.g., display screen on a mobile device) may display the virtual environment, virtual characters, and other gaming information to the player.

The components illustrated in FIG. 3 may be implemented as hardware, software, and/or a combination thereof, on one or more platforms or devices.

Figure 4:
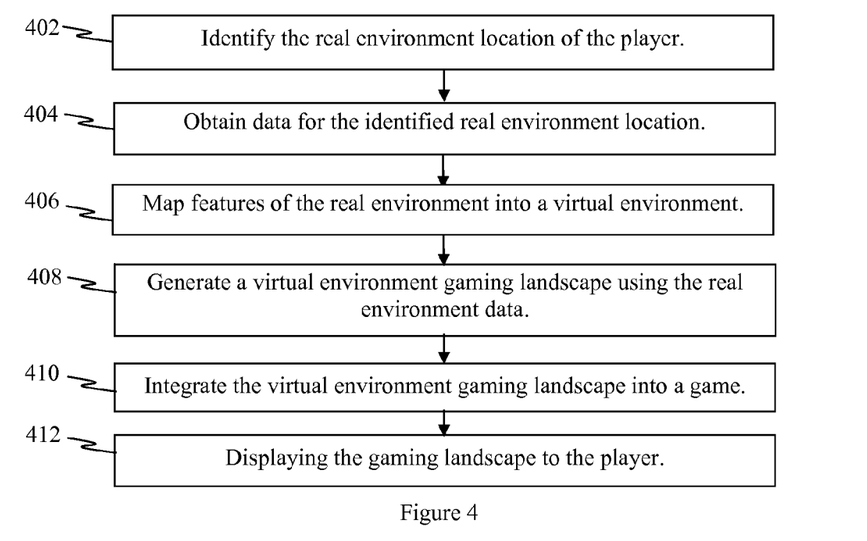
FIG. 4 illustrates a method operational on a gaming server and/or a mobile device to facilitate mapping between a real environment and a virtual environment to extend a gaming landscape into the real environment.

FIG. 4 illustrates a method operational on a gaming server and/or a mobile device to facilitate mapping between a real environment and a virtual environment to extend a gaming landscape into the real environment. A player's real environment location is identified 402, data for the identified real environment location is obtained 404, and features of the real environment are mapped to a virtual environment 406. A virtual environment gaming landscape is then generated or rendered using the real environment data 408. The virtual environment gaming landscape is integrated into a game 410 which is then displayed to the player 412 via a mobile device.

In some implementations, the mapping and/or blending of a real environment and virtual environment may be dynamically executed in real-time or near real-time as a player moves through the real environment. In other implementations, certain real environments may be pre-mapped by a game creator and stored for future rendering of a virtual environment.

Immersing Real World Player into Virtual Environment

In addition to mapping a real environment into a virtual environment, a player in the real environment may also be mapped to a corresponding character in the virtual environment, thereby inserting the person's movements and actions into the virtual environment. This feature enables interaction between characters located in a real environment with those found in a virtual environment.

Figure 5:
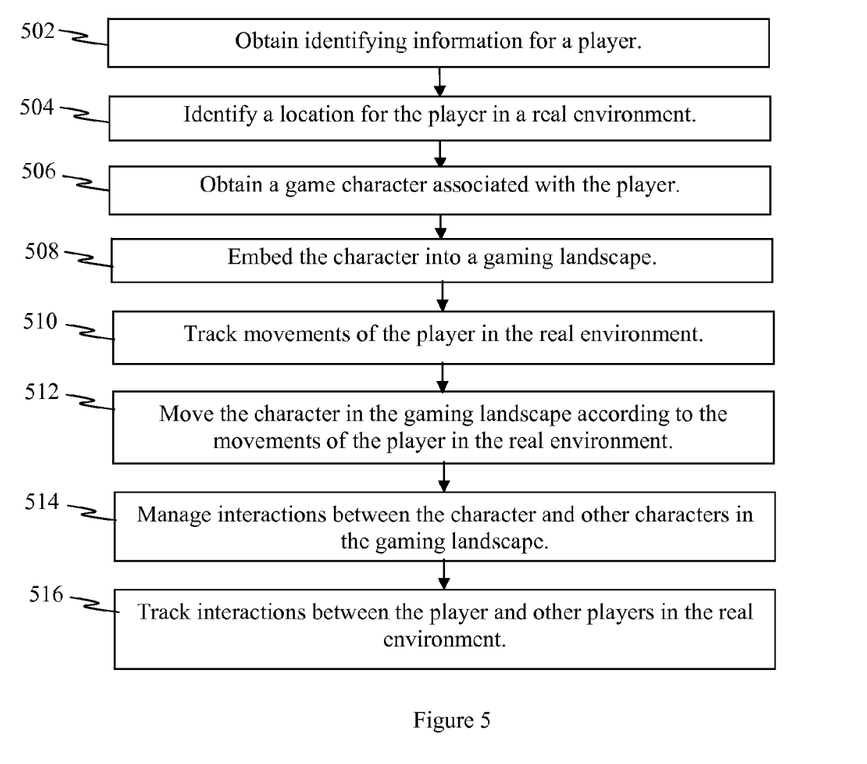
FIG. 5 illustrates a method operational on a mobile device and/or gaming server to facilitate interactions between a player in a real environment with players in a virtual environment.

FIG. 5 illustrates a method operational on a mobile device and/or gaming server to facilitate interactions between a player in a real environment with players in a virtual environment. For a particular player, identifying information, such as a name, identifier, etc., is obtained 502. A location is identified for the player in a real environment 504. A game character associated with the player is obtained 506. For example, a character in a virtual reality game may be created, generated, and/or retrieved and associated with the player. The character is embedded or integrated into a gaming landscape 508. Movements (or actions) of the player in the real environment are tracked 510. The character in the gaming landscape is moved according to the movements of the player in the real environment 512. Interactions between the character and other characters in the gaming landscape are managed 514. For instance, characters may communicate or message with each other, exchange objects or data, etc. Additionally, interactions between the player and other players in the real environment are also tracked 516. For instance, communications, contacts, and/or other interactions or exchanges between the players in the real environment may be monitored to determine gaming activity.

Device Configured to Facilitate Real and Virtual Environment Interaction

To allow a player to play an interactive virtual game in a real environment, a mobile device may be configured to provide real and virtual environment interaction. The mobile device may be a communication device (e.g., mobile phone, mobile digital assistant, mobile gaming device, etc.) including an output interface to provide video, audio, tactile or other output to the player and/or an input interface that allows a player to interact with the virtual environment and/or other players.

Figure 6:
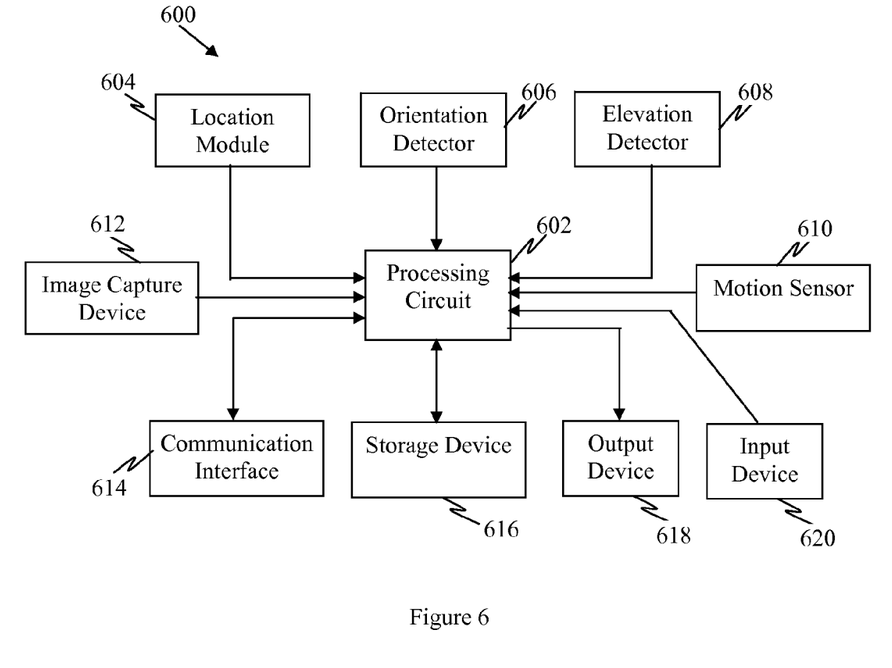
FIG. 6 illustrates one example of a mobile device configured to provide a player in a real environment with an interface to a corresponding virtual environment as part of an interactive virtual game.

FIG. 6 illustrates one example of a mobile device 600 configured to provide a player in a real environment with an interface to a corresponding virtual environment as part of an interactive virtual game. A processing circuit 602 may be coupled to one or more devices that allow it to capture and/or locate the real environment. For instance, a location module 604 may use global positioning (or other methods) to provide a location for the mobile device 600. This allows the processing circuit 602 to identify the environment (e.g., region, street, building, park, etc.) in which the player is located. Similarly, an orientation detector 606 (e.g., an electronic compass) may detect the orientation of the mobile device 600 to allow the processing circuit 602 to display the view which the player may be facing. An elevation detector 608 is coupled to the processing circuit 602 to assist it in determining the altitude of the player (e.g., floor in a building, or position on a mountain). A motion sensor 610 may also be coupled to the processing circuit 602 to sense the movement, acceleration, rotation, and/or speed of the player. An image capture device 612 may be coupled to the processing circuit to provide images of the real environment that can be used by the processing circuit 602 to identify and/or render the virtual environment. A communication interface 614 is coupled to the processing circuit 602 to allow the mobile device 600 to communicate (wirelessly or via wired network and/or communication channel) with other mobile devices and/or a centralized gaming server. This allows the mobile device 600 to transmit its position and/or movement information to other players and to receive the same information from other players. Additionally, a storage device 616 may allow the mobile device 600 to store gaming data, virtual environment data, and/or other data to implement the virtual game. An output device 618, such as a display screen, speaker, etc., may serve to provide gaming information to the player. An input device 620, such as a keypad, microphone, camera, etc., enables a player to provide information to other players and/or the interactive game.

In various implementations, the interactive game may be executed locally by the processing circuit 602 and updated with information from other players. In other implementations, the virtual game may be executed by a centralized server which then uses the mobile device as an output interface to the player.

The mobile device 600 may also be configured to operate as a game-specific accessory. For example, the mobile device 600 may operate as a virtual rifle that can ascertain the direction in which it is pointed from the location module 604 and/or orientation detector 606. Solid state accelerometers may be used to ascertain the orientation when the mobile device is not moving and update the orientation from the accelerometers when it is moving. Similarly, accelerometers may be used to detect when the player "shoots", "strikes", and/or otherwise interacts with other players. That is, the player's motion may translate to a particular action in the virtual environment. This enables a game to track the player's interactions within the real and virtual environments.

To further enhance and extend the real environment into a virtual environment of a game, other objects in the game might be given physical reality. For example, a treasure, scroll, etc., in the game may be associated with an object in the real environment that may have its own wireless and/or location interfaces that permit a player to find it (in the real environment). The mobile device 600 may be configured to read and/or communicate with the object via the wireless interface (e.g., RFID chip) to obtain proof that it has found the object. For this purpose, the mobile device 600 may also include an RFID reader. In some implementations, once a mobile device has identified such object, the game may give the player some special power or skill in the virtual environment.

Similarly, with appropriate security and Digital Rights Management capability, players that meet physically in a real environment may be able to exchange purely virtual possessions and other content (e.g., gaming weapons, assets owned in the virtual environment, etc.).

Figure 7:
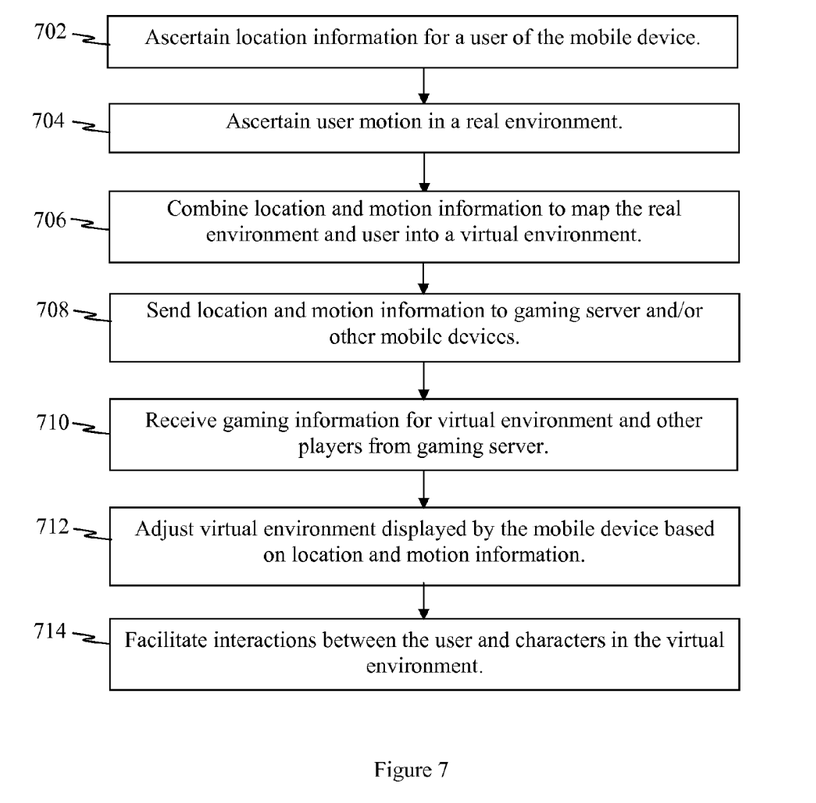
FIG. 7 is a method operational on a mobile device and/or gaming server to execute an interactive game that blends a real environment and virtual environment as part of a gaming landscape and facilitates player interaction.

FIG. 7 is a method operational on a mobile device and/or gaming server to execute an interactive game that blends a real environment and virtual environment as part of a gaming landscape and facilitates player interaction. Location information is ascertained for a user of the mobile device 702. User motion in a real environment is also ascertained 704. The location and motion information is combined to map the real environment and user into a virtual environment 706. The location and motion information may be sent to a gaming server and/or other mobile devices 708. Gaming information for the virtual environment and/or other players may be received from the gaming server and/or other mobile devices 710. This enables the mobile device to not only track the movement of the player in its virtual environment but also the movement and/or actions of other players in the same gaming landscape. The virtual environment displayed by the mobile device is adjusted based on the location and motion information 712. The mobile device may also facilitate interactions between the user and characters in the virtual environment 714. For instance, the mobile device may allow a player to speak with, and/or send messages to, another player.

Figure 8:
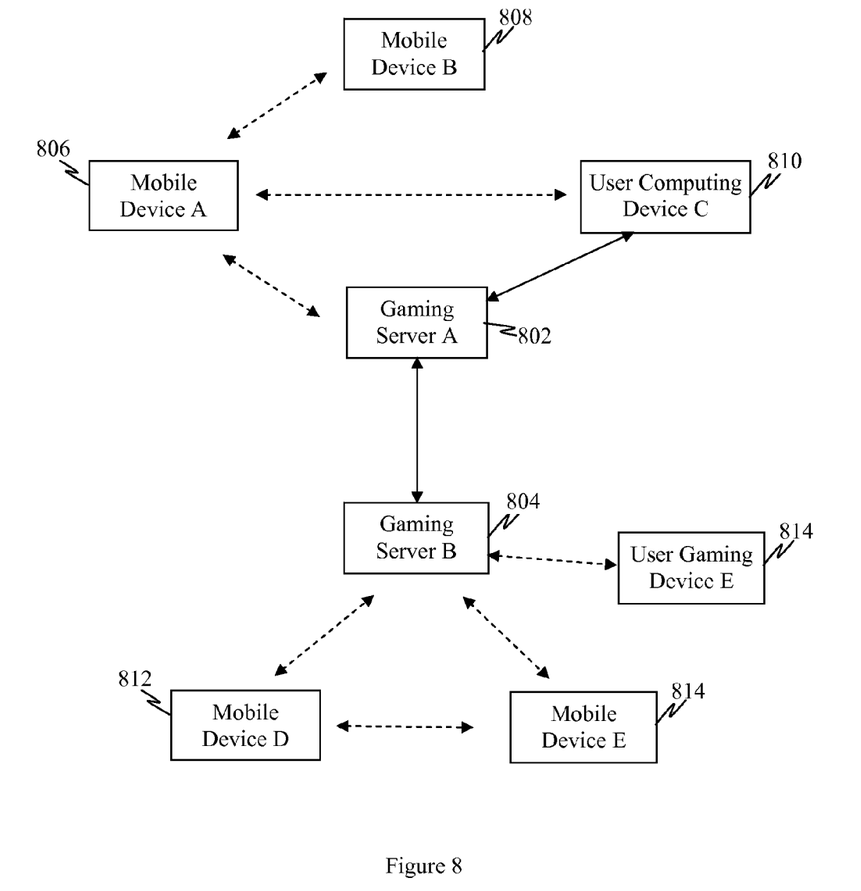
FIG. 8 is a block diagram illustrating the interaction between multiple mobile devices and gaming servers configured to integrate a real environment into a virtual environment of an interactive game.

FIG. 8 is a block diagram illustrating the interaction between multiple mobile devices and gaming servers configured to integrate a real environment into a virtual environment of an interactive game. One or more gaming servers 802 and 804 may be configured to assist in rendering gaming landscapes, creating and/or managing game characters, and/or interaction between the characters and/or players. A plurality of gaming servers 802 and 804 may be communicatively coupled to each other to allow players in distant geographical locations to play the same game.

A first gaming server 802 may communicate (e.g., via a wired or wireless network or channel) with one or more mobile devices 806 and 808 as well as one or more user computing device 810 (e.g., desktop computer or laptop). The mobile devices 806 and 808 may also communicate with each other, and/or with the user computing device 810, directly. Similarly, a second gaming server 802 may communicate with mobile devices 812 and 814 and/or other user gaming devices 814 that are geographically distant from the first gaming server 802. In one example, the second gaming server 804 may transfer communications between the user gaming device 814 and one or more mobile devices.

Blending Real and Virtual Economies

The integration of real environments into gaming landscapes also provides economic opportunities that extend for the real world to virtual environments. There is a trend emerging in gaming that associates real-world value with imaginary assets. For instance, a player may purchase a gaming asset (e.g., a magic scroll, weapon, virtual castle, etc.) using real money and the player's character in the gaming environment may then obtain the purchased gaming asset. There is also trade in developing good characters (sometimes called "gold farming") in which an affluent player will pay someone else to play the relatively boring initial stages of the game for them. The companies behind these games try to discourage these practices. Clearly, bringing the interactions back into the real world would allow much better control.

Figure 9:
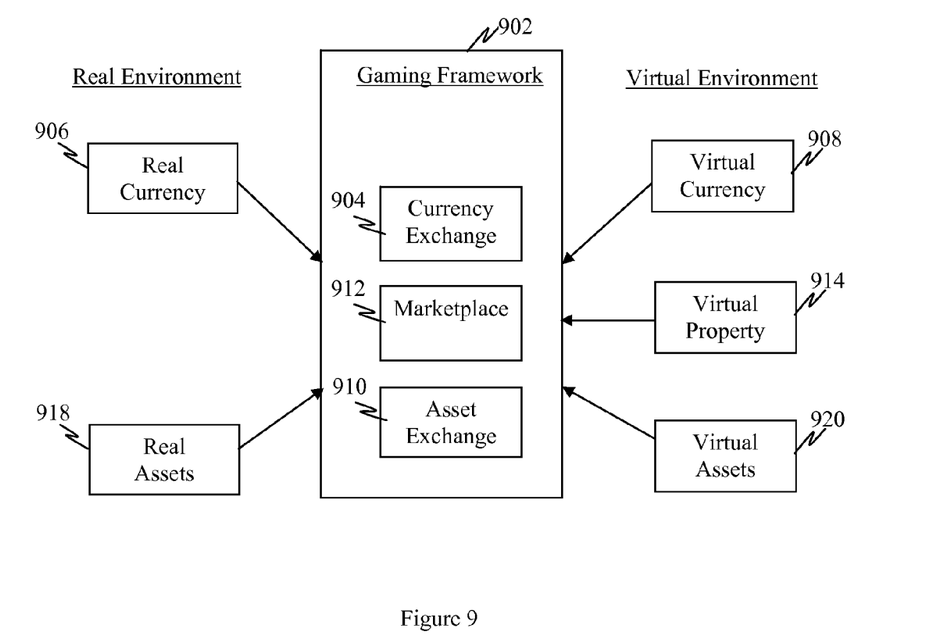
FIG. 9 is a block diagram illustrating a framework by which transactions between can be performed between a real environment and a virtual environment.

FIG. 9 is a block diagram illustrating a framework by which transactions between can be performed between a real environment and a virtual environment. A gaming framework 902 maybe operational on player mobile devices and/or a gaming server. This gaming framework 902 may include a currency exchange 904 that facilitates transactions between real currency 906 and virtual currency 908. Similarly, an asset exchange 910 allows exchanging real assets 918 and virtual assets 920 between the real and virtual environments. The gaming environment 902 may also include a marketplace 912 where players may buy and sell real and/or virtual objects and/or property. This framework allows characters in the virtual environment to meet in the real environment to perform these transactions.

One example of blending real and virtual economies involves branding opportunities in mapping between a real and virtual environment. For instance, a particular coffee shop may be mapped to a castle in a virtual environment. Players of the game may be guided to the coffee shop to collect free coffee as a reward for achieving a certain score. Alternatively, food and/or drinks may be sold to players who are guided by the game to a real world establishment. Players may also sign an electronic entry book at the coffee shop to record their visit to the virtual castle. In this way, a game may extend into the real world by and facilitate joint marketing opportunities (e.g., discounts at particular stores, store might pay to be included in the game itinerary, etc.).

Another example provides electronic commerce applications within a game. Since the players are involved in the game, they are in some sense "pre-authenticated". This facilitates performing electronic transactions from the gaming environment, where a player may buy something (e.g., a real drink or food) with virtual money at the real store that is mapped as part of the virtual game. Such transactions may simply appear as part of a monthly subscription bill for the game.

One or more of the components, steps, and/or functions illustrated in FIGS. 1, 2, 3, 4, 5, 6, 7, 8 and/or 9 may be rearranged and/or combined into a single component, step, or function or embodied in several components, steps, or functions without affecting the operation of the pseudo-random number generation. Additional elements, components, steps, and/or functions may also be added without departing from the invention. The apparatus, devices, and/or components illustrated in FIGS. 3, 6, 8 and/or 9 may be configured to perform one or more of the methods, features, or steps described in FIGS. 1, 2, 4, 5 and/or 7. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A computer-implemented method for extending a gaming landscape from a real environment into a virtual environment, comprising:
under the control of one or more computer systems configured with executable instructions,
identifying a first real environment location of a first player;
obtaining data for the identified first real environment location;
obtaining a virtual environment gaming landscape based at least in part on a second real environment location of a second player, the second real environment location being different from the first real environment location;
mapping features of the first real environment location into the virtual environment gaming landscape, wherein the first real environment location includes at least one feature that is different from features of the second real environment location, the mapping including:
identifying a first feature of the first real environment location, the first feature having a first feature type;
identifying a second feature of the first real environment location, the second feature having a second feature type;
transposing the first identified feature into a first virtual object having the first feature type; and
transposing the second identified feature into a second virtual object having a third feature type that is different than the first and second feature types to enable the first real environment location and the second real environment location to be mapped to the same virtual environment gaming landscape;
integrating the virtual environment gaming landscape into a game, wherein the virtual environment gaming landscape is the same for the first player and the second player; and
displaying a first view of the virtual environment gaming landscape to the first player.

2. The computer-implemented method of claim 1 further comprising:
adjusting the displayed view of the virtual environment gaming landscape based on the movements of the first player.

3. The computer-implemented method of claim 1 wherein mapping features of the first real environment location to the virtual environment gaming landscape further includes:
identifying one or more features associated with a "building" feature type in an area surrounding the first real environment location; and
associating at least one of the one or more features associated with the "building" feature type with a virtual object.

4. The computer-implemented method of claim 3 wherein integrating the virtual environment gaming landscape into a game includes:
integrating the virtual object into the virtual environment gaming landscape at a location corresponding to its real environment location.

5. The computer-implemented method of claim 1, further comprising:
obtaining identifying information for the first player;
identifying a location for the first player in the first real environment location;
obtaining a game character associated with the first player; and
embedding the character into the virtual environment gaming landscape.

6. The computer-implemented method of claim 5, further comprising:
tracking movements of the first player in the first real environment location; and moving the character in the virtual environment gaming landscape according to the movements of the first player in the first real environment location.

7. The computer-implemented method of claim 5, further comprising:
managing interactions between the character and other characters in the virtual environment gaming landscape; and
tracking interactions between the first player and other players in the first real environment location.

8. The computer-implemented method of claim 7, further comprising:
managing interactions between the first player in the first real environment location and one or more characters in the virtual environment gaming landscape.

9. The computer-implemented method of claim 7, wherein the interactions between the character and other characters includes at least one of fighting, cooperating, trading, and competing with the characters in the virtual environment gaming landscape.

10. The computer-implemented method of claim 7, wherein the interactions include one of at least the exchange, sale, or trade of an object.

11. The computer-implemented method of claim 1, further comprising:
facilitating transactions using currency in the real environment for assets in the virtual environment gaming landscape.

12. A mobile device comprising:
a location module configured to identify the location of the mobile device in a first real environment;
a processing circuit coupled to the location module and configured to:
ascertain location information for a user of the mobile device;
obtain a virtual environment gaming landscape based at least in part on a second real environment location of a second user of a second mobile device, the second real environment location being different from the first real environment location;
map features of the first real environment into the virtual environment gaming landscape based on the location information, wherein the first real environment location includes at least one feature that is different from features of the second real world environment location, wherein the mapping includes:
identifying a first feature and a second feature of the first real environment, the first feature having a first feature type and the second feature having a second feature type; and
transposing the first and second features into first and second virtual objects, the first virtual object having the first feature type and the second virtual object having a third feature type that is different than the first and second feature types to enable the first real environmental location and the second real environment location to be mapped to the same virtual environment gaming landscape;
integrate the virtual environment gaming landscape into a game, wherein the virtual environment gaming landscape is the same for the user of the mobile device and the second user of the second mobile device; and
an output device coupled to the processing circuit and configured to display a view of the virtual environment gaming landscape to the user.

13. The mobile device of claim 12, further comprising:
an orientation detector coupled to the processing circuit and configured to provide orientation information for the mobile device,
wherein the processing circuit is further configured to display a view of the virtual environment gaming landscape corresponding to a view indicated by the orientation information.

14. The mobile device of claim 12, further comprising:
a motion detection module coupled to the processing circuit, the motion detection module serving to ascertain user motion in the first real environment,
wherein the processing circuit is further configured to
associate a game character in the virtual environment gaming landscape to the user; and
adjust the movement of the game character according to the motion of the user in the first real environment.

15. The mobile device of claim 12, further comprising:
a communication module coupled to the processing circuit and configured to wirelessly receive gaming information from other characters corresponding to other users in the first real environment;
wherein the processing circuit is further configured to facilitate interactions between the user and the other characters in the virtual environment gaming landscape.

16. The mobile device of claim 12 further comprising: an image capture device configured to capture images of the first real environment, wherein the processing circuit is further configured to use the images to map features between the first real environment and the virtual environment gaming landscape.

17. The mobile device of claim 16 wherein the image capture device is configured to refine the position and orientation of the user within the virtual environment gaming landscape.

18. A mobile device comprising:
means for identifying a first real environment location of a first player;
means for obtaining data for the identified first real environment location;
means for obtaining a virtual environment gaming landscape based at least in part on a second real environment location of a second player, the second real environment location being different from the first real environment location;
means for mapping features of the first real environment location into the virtual environment gaming landscape, wherein the first real environment location includes at least one feature that is different from features of the second real environment location, wherein the mapping includes:
identifying a first feature of the first real environment location, the first feature having a first feature type;
identifying a second feature of the first real environment location, the second feature having a second feature type;
transposing the first identified feature into a first virtual object having the first feature type; and
transposing the second identified feature into a second virtual object having a third feature type that is different than the first and second feature types to enable the first real environment location and the second real environment location to be mapped to the same virtual environment gaming landscape;
means for integrating the virtual environment gaming landscape into a game, wherein the virtual environment gaming landscape is the same for the first player and the second player; and means for displaying a view of the virtual environment gaming landscape to the first player.

19. The mobile device of claim 18 further comprising:
means for adjusting the displayed view of the virtual environment gaming landscape based on the movements of the first player.

20. The mobile device of claim 18 further comprising:
means for identifying one or more features associated with a "building" feature type in an area surrounding the first real environment location; and
means for associating at least one of the one or more features associated with the "building" feature type with a virtual object.

21. The mobile device of claim 18 further comprising:
means for obtaining identifying information for the first player;
means for identifying a location for the first player in the first real environment location;
means for obtaining a game character associated with the first player; and
means for embedding the character into the virtual environment gaming landscape.

22. The mobile device of claim 21 further comprising:
means for tracking movements of the first player in the first real environment location; and means for moving the character in the virtual environment gaming landscape according to the movements of the first player in the first real environment location.

23. A non-transitory machine-readable storage medium having one or more instructions for mapping a real environment to a virtual environment as part of an interactive game, which when executed by a processor causes the processor to:
identify a first real environment location of a first player;
obtain data for the identified first real environment location;
obtain a virtual environment gaming landscape based at least in part on a second real environment location of a second player, the second real environment location being different from the first real environment location;
map features of the first real environment location into the virtual environment gaming landscape, wherein the first real environment location includes at least one feature that is different from features of the second real environment location, wherein the mapping includes:
identifying a first feature of the first real environment location, the first feature having a first feature type;
identifying a second feature of the first real environment location, the second feature having a second feature type;
transposing the first identified feature into a first virtual object having the first feature type; and
transposing the second identified feature into a second virtual object having a third feature type that is different than the first and second feature types to enable the first real environment location and the second real environment location to be mapped to the same virtual environment gaming landscape;
integrate the virtual environment gaming landscape into a game, wherein the virtual environment gaming landscape is the same for the first player and the second player; and
display a view of the virtual environment gaming landscape to the first player.

24. The non-transitory machine-readable storage medium of claim 23 having one or more instructions which when executed by a processor causes the processor to further:
adjust the displayed view of the virtual environment gaming landscape based on the movements of the first player.

25. The non-transitory machine-readable storage medium of claim 23 having one or more instructions which when executed by a processor causes the processor to further:
identify one or more features associated with a "building" feature type in an area surrounding the first real environment location; and
associate at least one of the one or more features associated with the "building" feature type with a virtual object.

26. The non-transitory machine-readable storage medium of claim 23 having one or more instructions which when executed by a processor causes the processor to further:
obtain identifying information for the first player;
identify a location for the first player in the first real environment location;
obtain a game character associated with the first player; and
embed the character into the virtual environment gaming landscape.

27. The non-transitory machine-readable storage medium of claim 26 having one or more instructions which when executed by a processor causes the processor to further:
track movements of the first player in the first real environment location; and
move the character in the gaming landscape according to the movements of the first player in the first real environment location.

28. A processing device, comprising:
a processing circuit configured to
identify a first real environment location of a first player;
obtain data for the identified first real environment location;
obtain a virtual environment gaming landscape based at least in part on a second real environment location of a second player, the second real environment location being different than the first real environment location;
map features of the first real environment location into the virtual environment gaming landscape, wherein the first real environment location includes at least one feature that is different from features of the second real environment location, wherein the mapping includes:
identifying a first feature of the first real environment location, the first feature having a first feature type;
identifying a second feature of the first real environment location, the second feature having a second feature type;
transposing the first identified feature into a first virtual object having the first feature type; and
transposing the second identified feature into a second virtual object having a third feature type that is different than the first and second feature types to enable the first real environment location and the second real environment location to be mapped to the same virtual environment naming landscape;
integrate the virtual environment gaming landscape into a game, wherein the virtual environment gaming landscape is the same for the first player and the second player; and
display a view of the virtual environment gaming landscape to the first player.

29. The processing device of claim 28, wherein the processing circuit is further configured to:
adjust the displayed view of the virtual environment gaming landscape based on the movements of the first player.

30. The processing device of claim 28, wherein the processing circuit is further configured to:
- identify one or more features associated with a "building" feature type in an area surrounding the first real environment location; and
- associate at least one of the one or more features associated with the "building" feature type with a virtual object.

31. The processing device of claim 28, wherein the processing circuit is further configured to:
- obtain identifying information for the first player;
- identify a location for the first player in the first real environment location;
- obtain a game character associated with the first player; and
- embed the character into the virtual environment gaming landscape.

32. The processing device of claim 31, wherein the processing circuit is further configured to:
- track movements of the first player in the first real environment location; and
- move the character in the virtual environment gaming landscape according to the movements of the first player in the first real environment location.

* * * * *